April 26, 1949.  A. JACOBOWITZ ET AL  2,468,296
FILTER LEAF
Filed Feb. 5, 1945  4 Sheets-Sheet 1
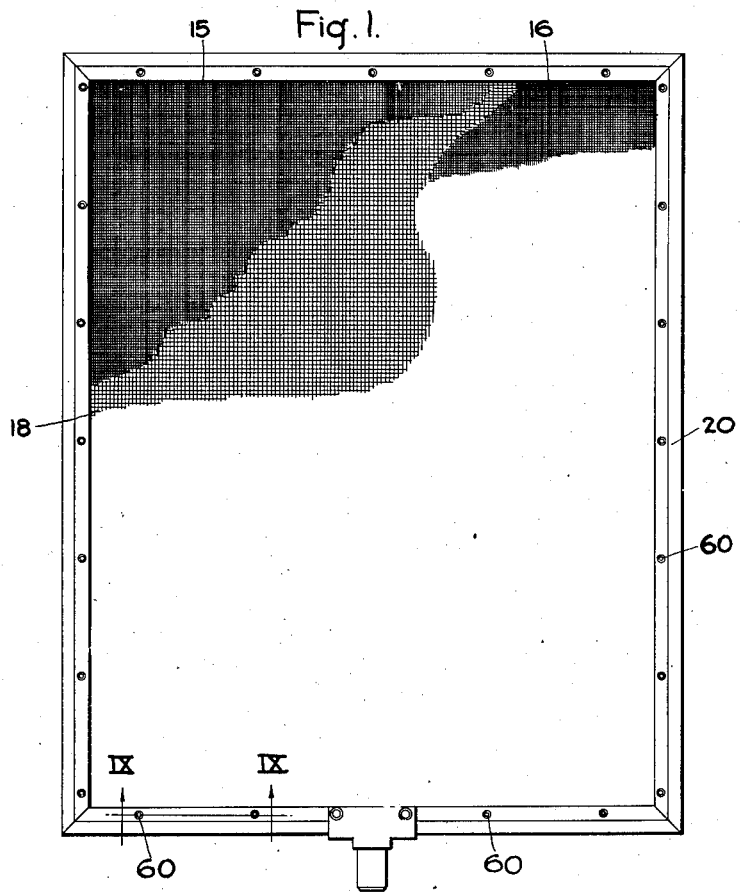
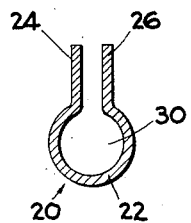
Fig. 3.
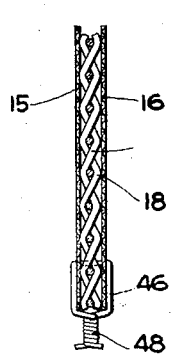
Fig. 2.
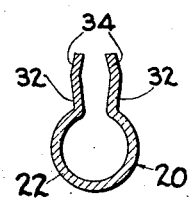
Fig. 4.
INVENTOR
ARNOLD JACOBOWITZ AND
BY EDWARD A. ULRICH
Bean, Brooks, Buckley & Bean  ATTORNEYS

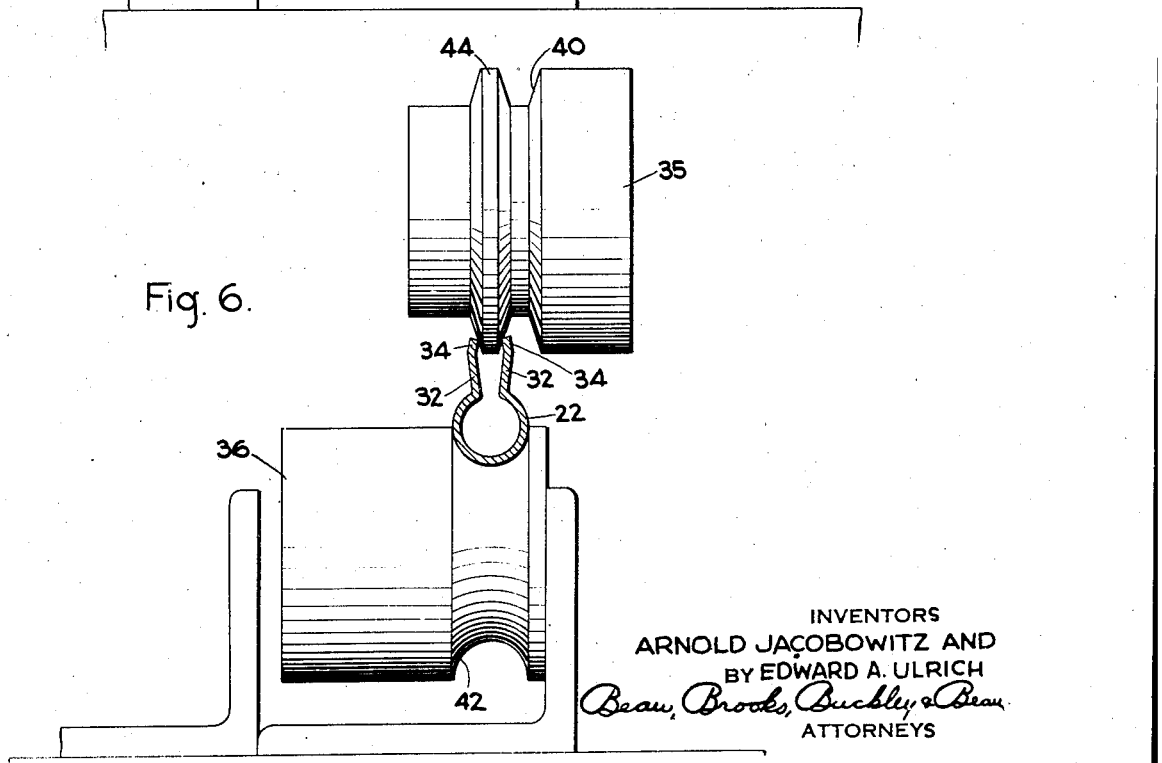

April 26, 1949.  A. JACOBOWITZ ET AL  2,468,296
FILTER LEAF
Filed Feb. 5, 1945  4 Sheets-Sheet 3
Fig. 7.
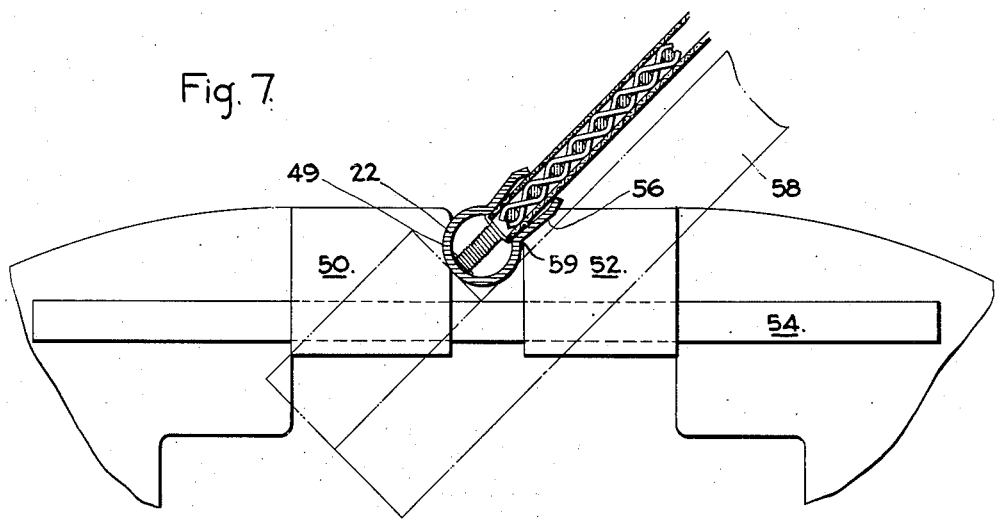
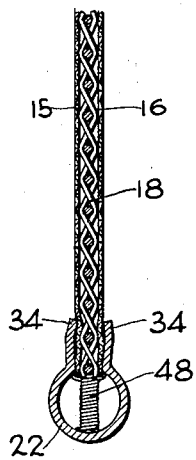
Fig. 8.
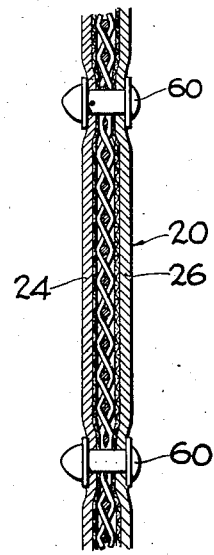
Fig. 9.
INVENTORS
ARNOLD JACOBOWITZ AND EDWARD A. ULRICH
BY
Bean, Brook, Buckley & Bean. ATTORNEYS April 26, 1949.                A. JACOBOWITZ ET AL                2,468,296
                                    FILTER LEAF
Filed Feb. 5, 1945                                          4 Sheets-Sheet 4
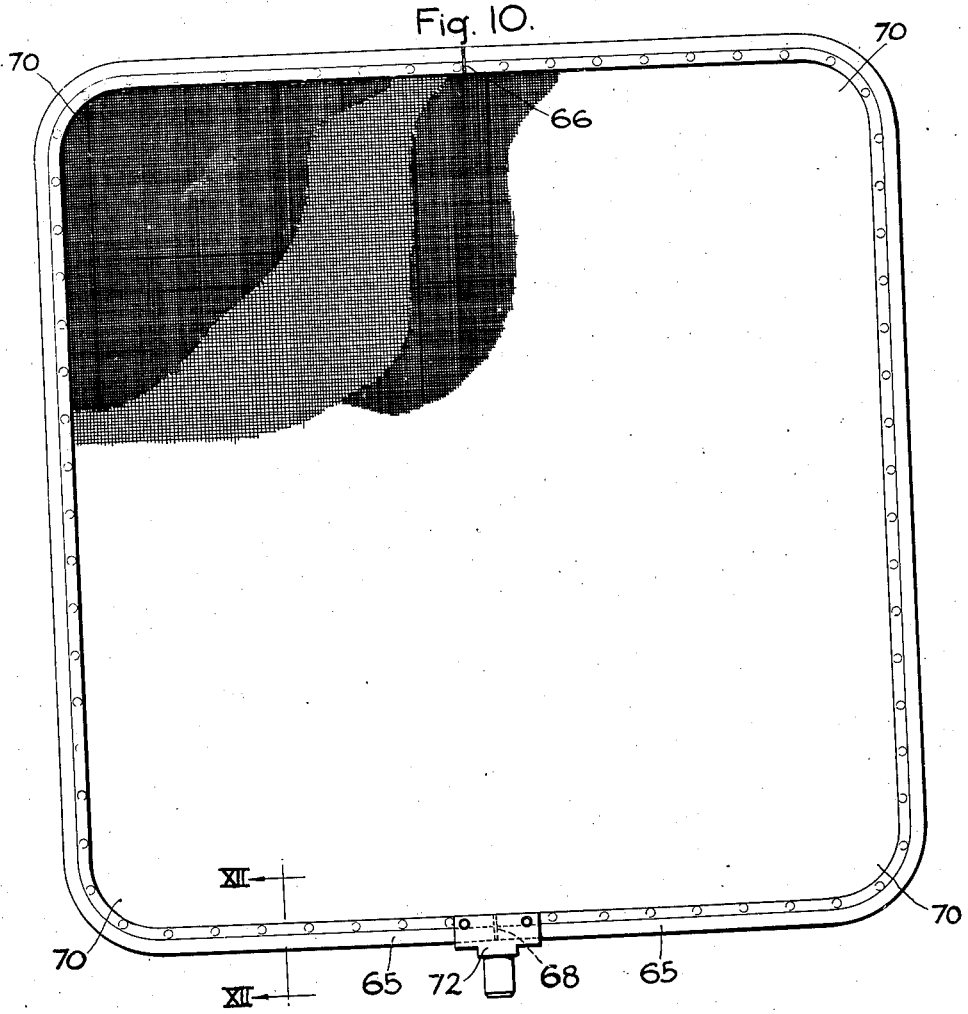
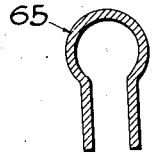
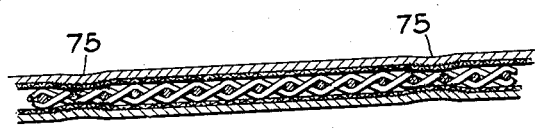
INVENTORS
ARNOLD JACOBOWITZ AND EDWARD A. ULRICH
BY
Beau, Brooks, Buckley & Beau.   ATTORNEYS

Patented Apr. 26, 1949

2,468,296

UNITED STATES PATENT OFFICE 2,468,296

FILTER LEAF

Arnold Jacobowitz, Buffalo, and Edward A. Ulrich, Kenmore, N. Y.; said Ulrich assignor to said Jacobowitz Application February 5, 1945, Serial No. 576,316

2 Claims. (Cl. 210—195)

This invention relates to industrial filtering apparatus, and more particularly to an improved filtering device of the leaf screen type and to improved methods for manufacturing the same.

One of the objects of the invention is to provide a filter leaf fabrication which is of structurally simple form and of improved performance characteristics. Another object is to provide a filtering device of the character described which is adapted to remain in trouble-free condition throughout longer periods of service, as compared to similar devices of the prior art.

Another object of the invention is to provide an improved filtering device of the character described which is so constructed as to be positively leak-proof at certain junctures of the fabrication without requiring the use of soldering or the like at such junctures. Another object of the invention is to provide a filtering device of the laminated screen cloth type which is bound perimetrically by binding strip means point-connected to the screen cloth elements in improved manner so as to preclude leakages of solids between the binding and screen cloth elements. Another object is to provide an improved method of fabricating filtering devices comprising metallic wire mesh elements marginally bound with metallic binding elements, whereby the mode of attachment of the binding elements is such as to provide tight junctures therebetween.

Another object is to provide an improved form of filtering device of the type comprising a laminated metallic wire mesh fabrication with marginal edge binding means riveted to the wire mesh fabrication. Another object is to provide an improved form of filtering device of the type comprising a laminated metallic wire mesh fabrication with marginal edge binding means welded to the wire mesh fabrication.

Other objects and advantages of the invention will be apparent from the specification hereinafter.

In the drawings:

Fig. 1 is an elevation of one form of the finally assembled filter leaf unit of the invention;

Fig. 2 is a fragmentary section through an edge portion of an assembly of wire mesh screen elements preliminary to mounting thereon the marginal binding elements into the finally assembled form of Fig. 1;

Fig. 3 is a section through a stock piece from which the marginal binding element is constructed;

Fig. 4 is a view similar to Fig. 3, but showing the sectional form of the binding element of Fig. 3 subsequent to performance thereon of an edge crimping operation;

Fig. 5 is a view diagrammatically illustrating performance of the edge crimping operation resulting in the formation of Fig. 4;

Fig. 6 is a view similar to Fig. 5 illustrating the next succeeding operation of spreading the crimped edge portions of the binding stock piece;

Fig. 7 is a diagrammatic illustration of the next succeeding operation which provides insertion and clamping of the wire screen fabrication within the marginal binding elements;

Fig. 8 is a fragmentary section similar to Fig. 2 showing the crimped connection between wire screen fabrication and the binding element subsequent to the operation of Fig. 7;

Fig. 9 is a fragmentary sectional view as along line IX—IX of Fig. 1, showing a supplemental fastening means for interconnecting the binding and the wire screen elements;

Fig. 10 is an elevation of another form of filter screen binding arrangement of the invention;

Fig. 11 is a view similar to Fig. 9 illustrating another form of supplemental interconnection between the binding and wire screen elements; and Fig. 12 is a sectional view as along lines XII—XII of Fig. 10 showing the general sectional form of the binding element thereof.

In the drawings, the invention is illustrated in Fig. 1, for example, in connection with fabrication of a filter leaf assembly comprising rectangular shaped wire mesh screen elements bound together perimetrically by means of a sectionally U-shaped clamping strip having opposed leg portions thereof overlapping and fixed to the outer marginal edge portions of the screen elements while the rounded body portion of the clamping strip provides interiorly thereon an open fluid channel contiguous to and encircling the perimeter of the screen unit. Thus, for example, the screen unit may be constructed to comprise a pair of wire mesh screen elements arranged in side-by-side relation with a suitable spacing means disposed therebetween, and the liquid to be filtered may be applied against the outer surfaces of the wire screen plates for filtering therethrough into the spaces between the screen elements. The filtrate will thereupon be free to circulate from all positions interiorly of the screen unit toward the margins thereof and into the perimetral fluid channel provided within the binding strip element. This binding strip element will be provided with a suitable fluid transmission port for connection to the filtrate conveying conduit of the filtering system so that the filtered liquid may be delivered wherever desired.

For example, as illustrated in Figs. 1-2, a filter leaf unit of the invention may be fabricated of a pair of parallel disposed fine mesh screen elements such as are designated at 15—16 in the drawing; said screen elements being separated by any suitable means such as a relatively coarse wire screen member 18 so as to provide a maze of communicating fluid channels between the screen elements 15—16 for free flow of filtrate from all portions interiorly of the filter unit toward the marginal edges thereof. The marginal binding element of the filter unit of Fig. 1 is illustrated at 20 to comprise a hollow metal binding member which may be conveniently fabricated of standard stock in strip form such as may be purchased in stock lengths from metal specialty manufacturers. As shown in Fig. 3, the binding stock material is sectionally shaped to comprise a central annular body portion 22 subtended by parallel extending leg portions 24—26. Thus, the binding stock strip 20 is adapted to have its leg portions 24—26 slip-fitted to enclose upon the marginal edges of the screen cloth assembly (Fig. 2) in such manner as to grip the screen cloth fabrication between the leg portions of the binding element while leaving the hollow body portion thereof to extend beyond the limits of the wire screen fabrication so as to provide a hollow fluid chamber 30 interiorly of the binding element and entirely encircling the marginal edges of the screen unit. Thus, the marginal binding of the screen unit may be formed of suitable lengths of stock which are preferably mitrecut at positions corresponding to the corners of the filtering unit so that the mitred ends of the binding pieces may be welded or otherwise suitably connected to provide a rectangular framing structure for embracing the marginal edges of the screen cloth fabrication.

It will be appreciated that it is of utmost importance to provide the structural junctures between the legs of the binding element pieces and the screen cloth contiguous thereto such as to be positively sealed against leakages therethrough of the solid materials in the liquid being treated. Also, it is usually highly desirable to provide such leak-proof junctures of the screen cloth and binding elements without employment of extraneous materials such as soldering or resilient gasket or caulking materials, or the like. The use of such additive sealing devices is particularly prohibited whenever the filter unit is to be employed in food processing or other chemical handling industries, for various reasons. For example, in many food processing industries the screen cloth and binding elements of the filter unit must of necessity be formed of stainless steel or some other alloy such as will be highly resistant to chemical change in the presence of the materials being handled. In such cases employment of additive organic type caulking materials are strictly prohibited because of their deterioration characteristics in the presence of such food materials. Also, in such cases employment of a juncture sealing device such as soldering might be impossible or undesirable because of incompatibility of the metals involved such as might operate to set up an undesirable corrosion or electro-chemical action such as would produce chemical change of the metals or undue deterioration thereof as might be harmful to the materials being processed.

Therefore the present invention contemplates, and it is a particular feature of the present invention, that the binding element pieces 20 are fixed to the marginal edges of the screen cloth fabrication in a particular manner and in accord with a specific mounting technique; whereby the junctures between the binding element legs and the screen cloth fabrication will be leak-proof against the materials to be filtered out of the liquid being treated, and without employing additive sealing materials. It will of course be understood that the term "leak-proof" as used herein means sufficiently sealed to prevent passage of particles which may be as small, for example, as 25 microns; such as diatomaceous earth filter-aids and micro-organisms such as yeast, bacteria, colloidal substances, and the like.

To this end the binding element pieces are preferably preshaped into the sectional form shown in Fig. 4 before the binding element pieces are slip-fittted into assembled position upon the screen cloth fabrication. In order to shape the binding element pieces to the sectional form shown in Fig. 4 the standard stock pieces as illustrated by Fig. 3 may be passed between a pair of rolls 35—36 as illustrated in Fig. 5. A bolster strip 38 will preferably be first inserted between the legs 24—26 of the binding element piece so as to maintain the major body portions of the legs in relatively spaced and parallel relation while the roller 35 presses the extreme ends of the legs to incline inwardly to form the inturned edge portions 34 thereof. For this purpose the roll 35 is peripherally grooved in V-sectioned form as indicated at 40, and the roll 36 is preferably grooved to semi-circular form as indicated at 42 so as to accommodate the rounded body portions 22 of the binding edge pieces without deforming the latter during the leg bending operation.

Subsequent to passage of the binding strip pieces through the rolls 35—36 of Fig. 5, they may next be passed through rolls for the purpose of spreading the leg portions 32—32 into non-parallel relation as shown in Fig. 4. For example, the roll 35 may be formed with a wedge shaped ridge 44 extending peripherally thereof and adapted to be impressed between the legs of the binding strip pieces upon shifting of the roll 35 so as to bring the ridge 44 into registry therewith. Thus, the binding strip pieces will be formed into the sectional shape illustrated by Fig. 4, the inturned edge portions 34 thereof being angularly arranged forming with the legs 32 reinforcing or stiffening flanges to prevent bulging of the binding strip between fastening means as hereinafter described.

Prior to mounting the binding strip pieces upon the wire mesh fabrication it is preferable to lace the wire mesh sheet elements together at intervals along the perimeter of the wire mesh assembly so as to maintain the sheet elements thereof accurately in proper relative position at all times and particularly throughout the operations of slip-fitting and clamping the binding element pieces onto the wire mesh fabrication. For this purpose I prefer to employ a metal wire lacing such as indicated at 46 in Fig. 2 at intervals along the perimeter of the wire mesh assembly; each of said lacings comprising a wire threaded into registering openings through the wire mesh sheets and having its ends looped about the adjacent marginal edge of the fabrication and twisted upon themselves as indicated at 48. The twisted end structures 48 are arranged to extend radially of the wire mesh fabrication and are cut off or otherwise dimensioned so as to extend beyond the marginal edges thereof to equal distances such as to adapt their outer ends to bear against the inner surface of the rounded body portion 22 of the binding element pieces when the latter are slip-fitted in finally assembled position thereon so as to accurately space the marginal edges of the wire mesh fabrication from the inner surfaces of the binding strip pieces. The twisted wire structure 48 as shown in Fig. 2 is of lesser diameter than the thickness dimension of the wire mesh fabrication, and therefore even though the twisted wire extends across the interior of the chamber portion 30 of the binding element it does not block this passageway and filtrate is free to circulate therethrough.

To clamp the binding element pieces upon the wire mesh fabrication it is required to upset the material of the binding element legs in a particular fashion. This is illustrated in Fig. 7 wherein a binding element piece is shown to be slip-fitted upon a wire mesh fabrication while the rounded body portion 22 of the binder is being supported in a concave face portion 49 of one jaw 50 of a bench vise. The vise includes a second jaw 52; and the jaws 50—52 may be carried as upon a slide bar 54 so as to be relatively movable toward and away from clamping positions. The jaw 52 of the vise is beveled as at 56 so as to receive one leg portion of the binding element piece and to support it in a reclining attitude at approximately 45° away from vertical, while the rounded body portion of the binding element piece is engaged by the concave face 49 of the vise jaw 50. A frame 58 may be employed if desired to support the entire wire mesh and binding element fabrication while being handled and shifted relative to the vise.

To clamp the binding element piece upon the wire mesh fabrication, commencing from the position shown in Fig. 7 the vise actuating mechanism is first operated to draw the jaws toward one another whereupon the jaw 52 will exert a pressure tending to squeeze the ledge portion 59 of the binding element piece to the left as viewed in Fig. 7 and in a direction approximately 45° to the direction of general extent of the wire mesh fabrication. Simultaneously the upper edge portion of the vise jaw 52 will similarly press the upper crimped end portion 34 of the leg 32 laterally and into the wire mesh fabrication. Thus, a composition of clamping forces is imposed upon the right hand leg portion of the binding element piece relative to the rounded body of the binding element piece as distinguished from the opposite leg thereof; and the right hand leg is thereby upset to crease the wire fabrication and to be impressed therein in tightly sealing and clamped relation.

To complete the operation of mounting the binding element piece upon the wire mesh fabrication the vise is then released and the assembly withdrawn and turned about so as to replace the wire mesh fabrication to recline in the same attitude shown in Fig. 7 but with the opposite side thereof facing upwardly. Thus, the opposite side of the rounded body portion 22 will be thereby disposed against the concave face 49 of the vise jaw 50 while the previously left hand leg portion of the binding element piece will now constitute the right hand leg portion as viewed in Fig. 7 and will rest against the bevel edge 56 of the vise jaw 52. The vising operation is then repeated as described hereinabove, whereby the second leg portion of the binding element piece is pressed into creasing and sealing connection with the wire mesh fabrication while the materials of the body and leg portions of the binding element piece are upset as explained hereinabove so as to provide a permanent setting of the binding element piece in firmly clamped and sealing relation upon the wire mesh fabrication as shown in Fig. 8.

As shown in Figs. 1 and 9, the clamped mounting of the binding element 20 upon the wire mesh fabrication may be reinforced if required by riveting the fabrication together at intervals as indicated at 60. The rivet devices 60 may be provided of any suitable metal form, and the material thereof will of course be selected so as to be compatible with the other metal portions of the filter unit as well as resistant to the materials to be treated by the filter unit, as explained hereinabove. It is particularly noteworthy that it is of utmost importance that such riveting operation be conducted so as to avoid appreciable upsetting of the straight edge form of the binding element leg portions between the positions of adjacent riveting devices. Thus, as illustrated in Fig. 9, the riveting process must be so performed as to maintain the leg portions 32—32 of the binding element in straight line and firm crimped relation against the wire screen fabrication so as to avoid arching of the binding element leg portions between adjacent riveting devices away from proper sealing relation with the wire screen fabrication, and this is accomplished by the stiffening flanges formed by the angular relation of the edge portions 34 with the legs 32.

Fig. 10 illustrates another preferred filter leaf unit of the invention which is generally similar to the filter leaf construction of Fig. 1 but differs therefrom in that the binding element pieces thereof comprises a pair of binding element pieces 65—65 each of which is formed by bending a stock strip of sectional shape as shown in Fig. 12 into U-shaped configuration whereby the paired pieces are adapted to be slip-fitted upon opposite marginal edges of the wire mesh fabrication as explained hereinabove so as to meet in opposite leg abutting relation at points 66—68 of Fig. 10. In this case the corners of the wire mesh fabrication are preferably rounded as indicated generally at 70, and the binding element pieces are correspondingly bent to complement the rounded corner shapes thereof so as to provide a streamlined directional turn fluid channel completely surrounding the perimeter of the wire mesh fabrication. The abutting end portions of the binding element pieces are preferably welded together at 66—68, and a fluid outlet fitting of T-form as shown at 72 may be fitted upon and fixed to the binding element structure at any position therearound as may be preferred, to provide a fluid outlet connection from which liquid filtering through the screens of the unit may be conducted to points of further use.

Preferably, the connection of the binding element structure to the wire mesh fabrication will be reinforced as explained in connection with the filter leaf assembly of Fig. 1. Thus, rivet devices may be employed to connect the binding element structure to the wire mesh fabrication as illustrated in Fig. 9 and as explained hereinabove. Or, as illustrated in Fig. 11, the binding structure may be reinforced relative to the wire mesh fabrication by means of a suitable welding process, and for this purpose a pair of pressure-applying opposed electrodes may be brought into clamping relation upon the binding element legs at positions spaced therealong as indicated at 75—75 in Fig. 11. The simultaneous application of clamping pressure and welding current through the clamping electrodes will result in a welding of the binding element legs to the wire mesh elements therebetween, and as in the case of the riveting processes explained hereinabove the electrode pressure forces must be regulated so as to avoid upsetting of the straight line edge forms of the binding element legs so as to prevent bulging thereof away from sealing relation with respect to the wire mesh fabrication between positions of adjacent welding applications.

Although only a few forms of the invention have been shown and described in detail it will be apparent to those skilled in the art that the invention is not so limited that various changes may be made therein without departing from the spirit of the invention or the scope of the appended claims.

What is claimed is:

1. A filter leaf unit comprising a perforate sheet element and a backing sheet element disposed in back-to-back relation and having marginal edges thereof substantially coextensive, a binding element comprising a generally U-shaped member having opposite leg portions thereof directly engaging opposite face portions of the assembled sheet elements at the marginal edges thereof and an open interior body portion subtending said leg portions and providing an open fluid channel extending perimetrically of said filter leaf unit, and a sheet element lacing device threaded through registering openings in said sheet elements and wound about adjacent marginal edge portions thereof and having its opposite ends twisted upon themselves to provide a twisted structure extending laterally of said sheet element assembly into abutting registry with the interior wall of said binding element body portion, said binding element having its leg marginal edge portions secured to said sheet element by pressure-applied fastening means at intervals therealong.

2. A filter leaf unit comprising a pair of screen elements disposed in back-to-back and spaced relation and having marginal edges thereof substantially coextensive, screen element lacing means tying said elements together and extending laterally beyond the perimeters thereof in the formation of spacers, and a binding element comprising a generally U-shaped member having opposite leg portions thereof embracing opposite face portions of the assembled screen elements at the marginal edges thereof and an open interior body portion subtending said leg portions and providing an open fluid channel extending perimetrically of said filter leaf unit and bounded by a rear wall portion abutting the extending end of said lacing means, said binding element having each of its leg portions formed with a marginal edge stiffening flange, said flanges extending over said marginal edges in spring-pressed creasing engagement, and a plurality of pressure-applied fastening means extending through said legs and said marginal edges at intervals therealong.

ARNOLD JACOBOWITZ.
EDWARD A. ULRICH.

REFERENCES CITED

The following references are of record in the file of this patent:

UNITED STATES PATENTS

| Number | Name | Date |
|---|---|---|
| 1,370,470 | Martel | Mar. 1, 1921 |
| 1,381,944 | Sweetland | June 21, 1921 |
| 1,601,947 | Edmunds | Oct. 5, 1926 |
| 1,867,397 | Brace et al. | July 12, 1932 |
| 2,061,351 | Denhard | Nov. 17, 1936 |
| 2,328,148 | Jacobowitz | Aug. 31, 1943 |